United States Patent
Goto et al.

(10) Patent No.: US 8,429,443 B2
(45) Date of Patent: *Apr. 23, 2013

(54) COMPUTER SYSTEM AND BOOT CONTROL METHOD

(75) Inventors: Tetsuhiro Goto, Hadano (JP); Kazuhiro Adachi, Hadano (JP)

(73) Assignee: Hitachi, Ltd., Tokyo (JP)

( * ) Notice: Subject to any disclaimer, the term of this patent is extended or adjusted under 35 U.S.C. 154(b) by 27 days.

This patent is subject to a terminal disclaimer.

(21) Appl. No.: 13/086,726

(22) Filed: Apr. 14, 2011

(65) Prior Publication Data
US 2011/0191622 A1    Aug. 4, 2011

Related U.S. Application Data

(63) Continuation of application No. 12/640,678, filed on Dec. 17, 2009, now Pat. No. 7,949,892, which is a continuation of application No. 11/522,920, filed on Sep. 19, 2008, now Pat. No. 7,657,778.

(30) Foreign Application Priority Data

Sep. 28, 2005   (JP) .................................. 2005-281084

(51) Int. Cl.
*G06F 11/00*   (2006.01)
(52) U.S. Cl.
USPC .............................................................. 714/3
(58) Field of Classification Search ............... 714/6.23, 714/3
See application file for complete search history.

(56) References Cited

U.S. PATENT DOCUMENTS

| | | | | |
|---|---|---|---|---|
| 5,206,939 A | * | 4/1993 | Yanai et al. | 711/4 |
| 5,978,565 A | * | 11/1999 | Ohran et al. | 714/13 |
| 6,643,795 B1 | * | 11/2003 | Sicola et al. | 714/6.21 |
| 6,691,184 B2 | * | 2/2004 | Odenwald et al. | 710/41 |
| 7,149,861 B2 | * | 12/2006 | Ogasawara et al. | 711/162 |
| 7,320,083 B2 | * | 1/2008 | Davies et al. | 714/3 |
| 7,467,191 B1 | * | 12/2008 | Wang et al. | 709/221 |
| 7,506,073 B2 | * | 3/2009 | Kuik et al. | 709/249 |
| 8,301,749 B1 | * | 10/2012 | Finklestein et al. | 709/223 |
| 2003/0188218 A1 | * | 10/2003 | Lubbers et al. | 714/5 |
| 2003/0225950 A1 | * | 12/2003 | Paul | 710/38 |
| 2005/0188239 A1 | * | 8/2005 | Golasky et al. | 714/2 |
| 2005/0216783 A1 | * | 9/2005 | Sundaram et al. | 714/4 |

FOREIGN PATENT DOCUMENTS

| | | |
|---|---|---|
| JP | 2002-063063 | 2/2002 |
| JP | 2002-126310 | 5/2002 |
| JP | 2002-149599 | 5/2002 |
| JP | 2003-241900 | 8/2003 |
| JP | 2004-334698 | 11/2004 |

* cited by examiner

*Primary Examiner* — Amine Riad
(74) *Attorney, Agent, or Firm* — Mattingly & Malur, PC

(57) ABSTRACT

When a primary computer is taken over to a secondary computer in a redundancy configuration computer system where booting is performed via a storage area network (SAN), a management server delivers an information collecting/setting program to the secondary computer before the user's operating system of the secondary computer is started. This program assigns a unique ID (World Wide Name), assigned to the fiber channel port of the primary computer, to the fiber channel port of the secondary computer to allow a software image to be taken over from the primary computer to the secondary computer.

6 Claims, 3 Drawing Sheets

| World Wide Name OF COMPUTER | ACCESSIBLE LOGICAL UNIT |
|---|---|
| a | LU#0(OS-A) |
| b | LU#1(OS-B) |
| c | LU#2(OS-C) |
| d | − |

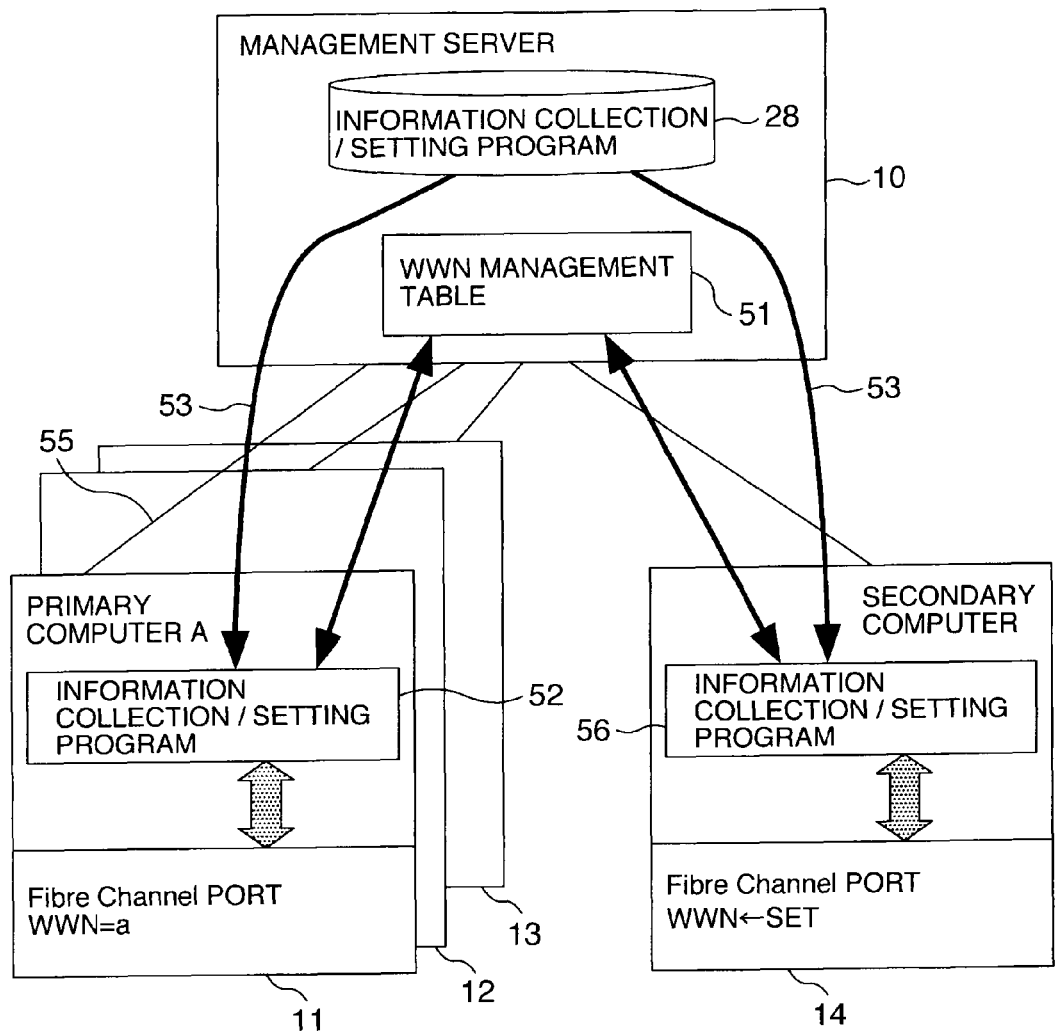

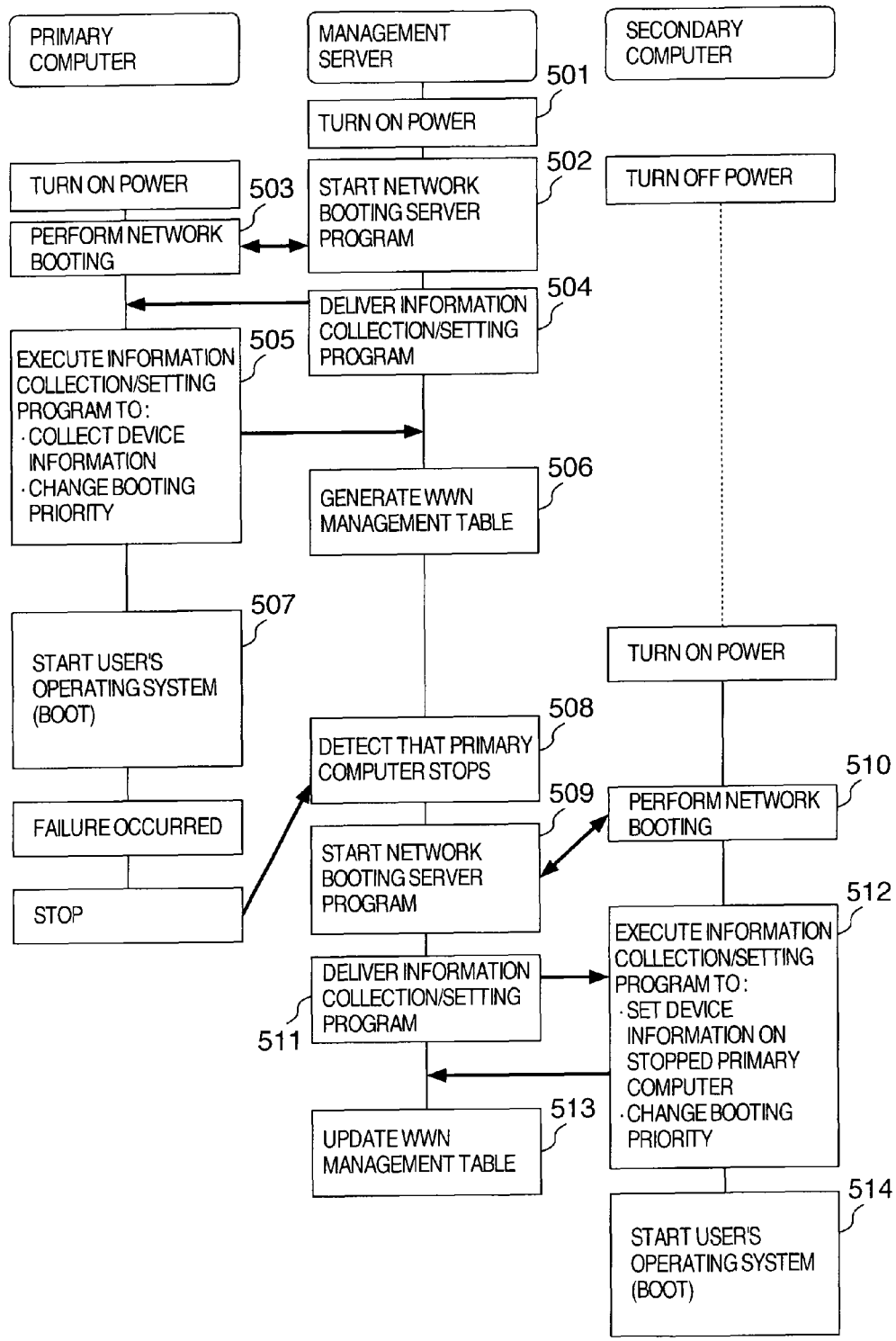

COMPUTER SYSTEM AND BOOT CONTROL METHOD

This application is a continuation application of U.S. application Ser. No. 12/640,678, filed Dec. 17, 2009, now allowed, which is a continuation application of U.S. application Ser. No. 11/522,920, filed Sep. 19, 2006, now U.S. Pat. No. 7,657,778, the entirety of which are incorporated by reference.

INCORPORATION BY REFERENCE

The present application claims priority from Japanese application JP2005-281084 filed on Sep. 28, 2005, the content of which is hereby incorporated by reference into this application.

BACKGROUND OF THE INVENTION

The present invention relates to a boot control method for use in a computer system redundantly configured in a SAN environment.

Recently, more and more computer systems are booted via a fibre-channel-connected storage area network (SAN). In a conventional redundancy configuration computer system where booting is performed from a built-in hard disk of each computer, the operating system and application programs must be installed in both the primary computer and the secondary computer in a similarly configured form. On the other hand, when booting is performed in a SAN environment, the primary computer and the secondary computer can share the same RAID device via the SAN, allowing the primary computer and the secondary computer to share the software image in which the operating system is installed.

However, in a computer system where booting is performed in the SAN environment, the RAID device has the security function that enables only a computer to access the corresponding logical unit to protect data in the logical unit in the RAID device where the operating system is installed. Usually, this security function uses a unique ID (World Wide Name), assigned to the fibre channel port installed in each computer, to associate the logical unit where the operating system is installed with the unique ID (World Wide Name) assigned to the fibre channel port of the computer to allow only access from the fibre channel port with the ID (World Wide Name). In some cases, the ID unique to the device (World Wide Name) is recorded in the software including the operating system.

A prior art technology for the security function of a RAID device is disclosed in JP-A-2002-149599. A prior art technology for altering and taking over a World Wide Name in the fibre channel interface is disclosed in JP-A-2002-126310.

SUMMARY OF THE INVENTION

In the redundancy configuration of a computer system where booting is performed via the storage area network (SAN), the unique ID (World Wide Name) assigned to the fibre channel port of the primary computer differs from the unique ID assigned to the fibre channel port of the secondary computer. Therefore, when the primary computer is taken over to the secondary computer, the software image including the operating system cannot be directly taken over but the security function setting of the RAID device side must be changed via the SAN management software or the manual operation.

To solve the above problem, the present invention uses a management server or a service processor having the software delivery function. Before an operating system used by the user is started, the management server delivers an information collection/setting program to the computers to read and record unique IDs (World Wide Names) assigned to the fibre channel ports of primary computers. When a primary computer is taken over to a secondary computer, a unique ID (World Wide Name), assigned to the fibre channel port of the primary computer and recorded by the information collection/setting program, is set on the fibre channel port of the secondary computer before the operating system of the secondary computer is started. This allows a software image, including the operating system of the primary computer, to be used without change.

The present invention enables a primary computer and a secondary computer in a redundancy configuration computer system, where booting is performed via a storage area network (SAN), to use a software image including the operating system without changing the setting on the RAID device side.

Other objects, features and advantages of the invention will become apparent from the following description of the embodiments of the invention taken in conjunction with the accompanying drawings.

BRIEF DESCRIPTION OF THE DRAWINGS

FIG. 1 is a diagram showing the configuration of a redundancy configuration system in a SAN booting environment described in one embodiment of the present invention.

FIG. 3 is a diagram showing the overview of setting unique IDs by an information collection/setting program.

FIG. 4 is a diagram showing the configuration of a WWN management table.

FIG. 5 is a general flowchart showing the operation performed from the time a computer is taken over to the time a unique ID is set.

DESCRIPTION OF THE EMBODIMENTS

Figure 2:
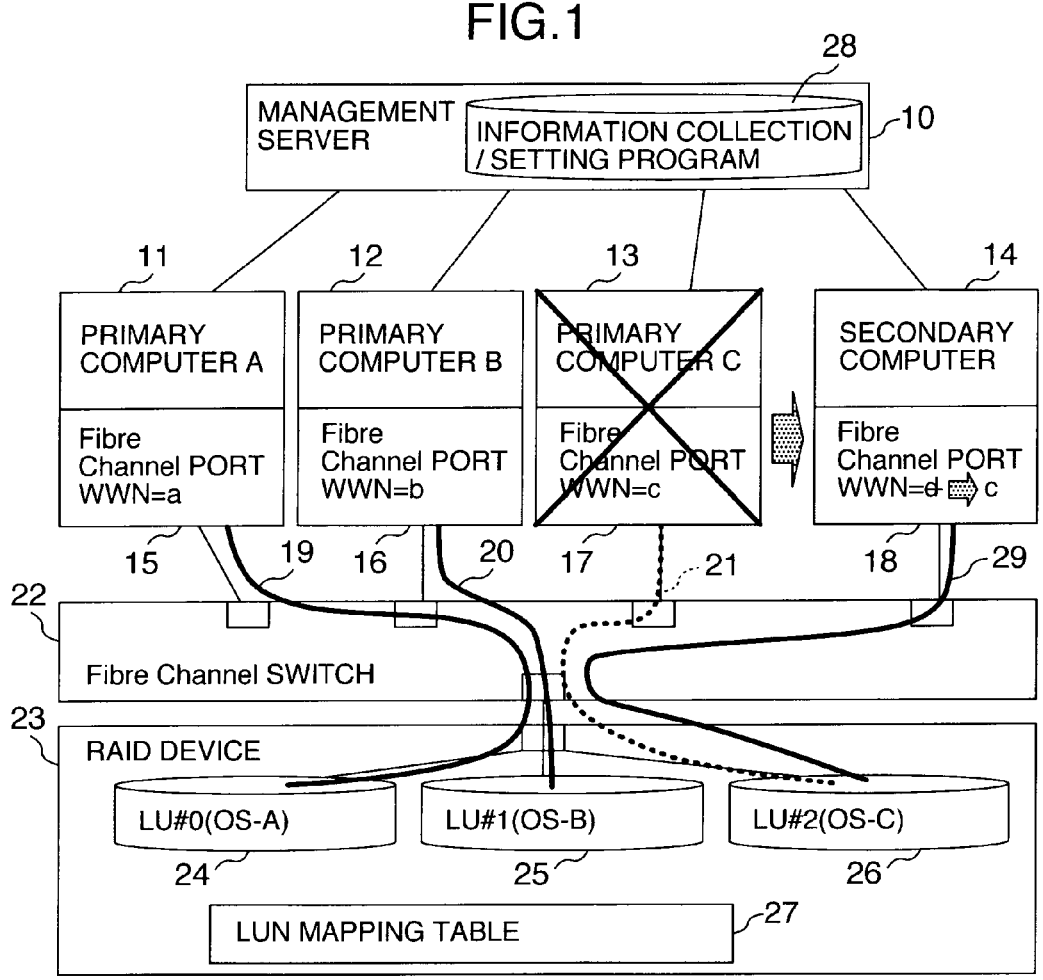
FIG. 2 is a diagram showing the configuration of a table for managing LUN mapping information in a RAID device.

An embodiment of the present invention will be described below with reference to the drawings.

FIG. 1 is a configuration diagram showing the redundancy configuration of a computer system in the SAN booting environment. A management server 10 is a server that has the function for managing the device information on a primary computer A 11, a primary computer B 12, a primary computer C 13, and a secondary computer 14 and the function for delivering software such as the operating system or applications. The management server 10 may also be a service processor having the functions described above. The management server 10 delivers an information collection/setting program 28 for collecting device information before the operating systems of the primary computer A 11, primary computer B 12, primary computer C 13, and secondary computer 14 are started. The secondary computer 14 is a computer that can take over the processing when one of the primary computer A 11, primary computer B 12, and primary computer C 13 stops.

The primary computer A 11, primary computer B 12, primary computer C 13, and secondary computer 14 each have one or more fibre channel ports 15, 16, 17, and 18. The fibre channel ports 15, 16, 17, and 18, each with a unique ID (World Wide Name), are connected to a RAID device 23 via a fibre channel switch 22. The operating systems to be booted are defined in the RAID device 23: OS-A 24 for the primary computer A 11, OS-B 25 for the primary computer B 12, and OS-C 26 for the primary computer C 13. A LUN mapping table 27, which associates the unique ID (World Wide Name) assigned to the fibre channel port of each computer with an operating system, is also provided to form logical connections 19, 20, and 21 between the operating systems and the computers. The logical connections 19, 20, and 21 control access; for example, the logical connections inhibit the primary computer A 11 from accessing OS-B 25.

When the primary computer C 13 stops in the redundancy configuration of the computer system described above, the management server 10 delivers an information collection/setting program 28 before starting the operating system of the secondary computer and sets the unique ID (World Wide Name=WWN=c), assigned to the fibre channel port 17 of the primary computer C 13, to the fibre channel port 18 of the secondary computer 14. This changed setting forms a logical connection 29 without updating the setting of the RAID device 23, allowing the secondary computer 14 to use the operating system OS-C 26 originally defined in the RAID device 23 for use by the primary computer C 13.

FIG. 2 is a diagram showing the structure of the LUN mapping table 27. "World Wide Name of computer" indicates the unique ID (World Wide Name) assigned to the fibre channel port of each computer, and "Accessible logical unit" indicates the logical unit defined in the RAID device. This LUN mapping table 27, which associates the computers with logical units, limits a computer from accessing the logical units associated with other computers to protect the contents of those logical units.

FIG. 3 is a configuration diagram showing how the unique IDs (World Wide Names) assigned to the fibre channel ports of the computers are read and set before the operating systems are started. The management server 10 delivers (53) the information collection/setting program 28 to the computers before the operating systems used by the users are started. A delivery path 55 used in this case may be a standard Ethernet (registered trademark) or a dedicated interface. An information collection/setting program 52, delivered to the primary computers 11, 12, and 13, reads the unique IDs (World Wide Names) assigned to the fibre channel ports and registers them in a WWN management table 51 in the management server 10. When a primary computer stops, an information collection/setting program 56 is delivered (53) also to the secondary computer 14 before the operating system used by the user of the secondary computer 14 is started. The information collection/setting program 56 obtains the unique ID (World Wide Name), assigned to the fibre channel port used by the stopped primary computer, from the WWN management table 51 and sets the obtained unique ID to the fibre channel port of the secondary computer 14.

FIG. 4 is a diagram showing the structure of the WWN management table 51. "Computer name" contains the name or ID for identifying a computer, and "State" contains a flag indicating whether the computer is in operation state or stopped state. "Original WWN" indicates the original unique ID (World Wide Name) assigned to the fibre channel port of a computer and, for a standard fibre channel board, this ID sometimes indicates the unique ID (World Wide Name) recorded on the board. "Reassigned WWN" indicates the unique ID (World Wide Name) taken over from a primary computer for reassignment to the secondary computer.

FIG. 5 is a diagram showing the general flowchart for setting a unique ID (World Wide Name) when a primary computer is taken over to a secondary computer. In this example, the network booting server program is started in the management server to deliver the information collection/setting program. After the power is turned on (501), the management server starts the network booting server program to deliver the information collection/setting program (502). Typically, this network booting server program is a PXE (Preboot eXecution Environment) boot server. The primary computer performs network booting via the management server (503) and receives the information collection/setting program delivered from the management server (504). The information collection/setting program executed on the primary computer specifies the network booting priority or SAN booting priority as well as the RAID device where SAN booting is performed, collects the unique ID (World Wide Name) assigned to the computer, and notifies this information to the management server (505). The management server generates the WWN management table from the notified information (506). After the information collection processing of the information collection/setting program is completed, the primary computer is booted and the operating system used by the user is started (507). After that, upon detecting that the primary computer fails or stops (508), the management server starts the network booting server program (509). The secondary computer performs network booting via the management server (510), and the management server delivers the information collection/setting program to the secondary computer (511). The information collection/setting program is executed on the secondary computer, and the information, such as the unique ID (World Wide Name) of the stopped primary computer, booting priority, and the RAID device where SAN booting is to be performed, is set in the secondary computer (512). The management server reflects the updated unique ID (World Wide Name) on the WWN management table (513), and the secondary computer is booted and the operating system used by the user is started to take over the processing of the primary computer (514).

It should be further understood by those skilled in the art that although the foregoing description has been made on embodiments of the invention, the invention is not limited thereto and various changes and modifications may be made without departing from the spirit of the invention and the scope of the appended claims.

The invention claimed is:

1. A boot control method for a computer system having a plurality of computers including at least one primary computer, a management server that controls said plurality of computers, and a storage device that is shared by said plurality of computers, each computer having a fibre channel port for booting a software image including an OS (Operating System) of each computer from a storage area network, the software image including the OS of each computer is stored in a logical unit of said storage device, and a unique ID that is set on the fibre channel port of each computer is associated with the OS stored in the logical unit, said boot control method comprising the steps of:

managing, by said management server, unique IDs assigned to fibre channel ports of the computers, and when a primary computer fails, setting a unique ID assigned to a fibre channel port of the failed primary computer on a fibre channel port of a secondary computer; and accessing, by said secondary computer, a logical unit associated with the failed primary computer using a logical connection newly created between the secondary computer and the storage device based on the unique ID which was assigned to the fibre channel port of the failed primary computer, and booting a software image including an OS for the failed primary computer.

2. The boot control method for the computer system according to claim 1, further comprising the step of:

delivering, by said management server, an information collection program to the computers before software images of the computers are booted to execute the information collection program on the computers for collecting the unique IDs assigned to the fibre channel ports of the computers.

3. A computer system comprising a plurality of computers including at least one primary computer, a management server that controls said plurality of computers, a storage device in which a software image including an operating system of each computer is stored, and a fibre channel switch that connects said storage device to the computers, each computer having a fibre channel port for booting the software image of each computer from said storage device based on a unique ID that is set on the fibre channel port, wherein a unique ID set on a fibre channel port of each computer is associated with a software image stored in the storage device, said management server manages unique IDs assigned to fibre channel ports of the computers, and when a primary computer fails, sets a unique ID which was assigned to the fibre channel port of the failed primary computer on a fibre channel port of a second computer, and said secondary computer boots a software image including an operating system (OS) for the failed primary computer using a logical connection newly created between the secondary computer and the storage device based on the unique ID which was assigned to the fibre channel port of the failed primary computer.

4. The computer system according to claim 3, wherein said storage device has a plurality of logical units each of which contains a software image of each computer and has access information that associates unique IDs set on fibre channel ports of computers with software images stored in the logical units.

5. The computer system according to claim 3 wherein said management server is a service processor.

6. The boot control method for the computer system according to claim 1 wherein said storage device has access information associating unique IDs set on the fibre channel ports of the computers with OSs stored in the logical units.

* * * * *

UNITED STATES PATENT AND TRADEMARK OFFICE
CERTIFICATE OF CORRECTION

PATENT NO. : 8,429,443 B2  
APPLICATION NO. : 13/086726  
DATED : April 23, 2013  
INVENTOR(S) : Goto et al.

Page 1 of 1

It is certified that error appears in the above-identified patent and that said Letters Patent is hereby corrected as shown below:

ON THE TITLE PAGE

Please correct Item (63) Related U.S. Application Data, as follows:

(63) Continuation of application No. 12/640,678, filed on December 17, 2009, now Pat. No. 7,949,892, which is a continuation of application No. 11/522,920, filed on ~~Sep. 19, 2008~~Sep. 19, 2006, now Pat. No. 7,657,778.

Signed and Sealed this
Eighteenth Day of June, 2013

Teresa Stanek Rea
*Acting Director of the United States Patent and Trademark Office*